United States Patent [19]

Weidemeier et al.

[11] Patent Number: 5,210,154
[45] Date of Patent: May 11, 1993

[54] WATER-THINNABLE BAKING PAINTS AND USE THEREOF AS FILLER MATERIAL AND INTERMEDIATE STONE CHIP RESISTANT COAT, AS WELL AS PROCESS FOR PAINTING MOTOR VEHICLE BODIES

[75] Inventors: Klaus Weidemeier; Winfried Schmidt, both of Münster; Hans-Dieter Hille, Bergisch Gladbach; Bodo Müller, Würzburg, all of Fed. Rep. of Germany

[73] Assignee: BASF Lacke + Farben Aktiengesellschaft, Munster, Fed. Rep. of Germany

[21] Appl. No.: 613,473
[22] PCT Filed: Apr. 18, 1989
[86] PCT No.: PCT/EP89/00412
 § 371 Date: Dec. 10, 1990
 § 102(e) Date: Dec. 10, 1990
[87] PCT Pub. No.: WO89/10387
 PCT Pub. Date: Nov. 2, 1989

[30] Foreign Application Priority Data

Apr. 23, 1988 [DE] Fed. Rep. of Germany ....... 3813866

[51] Int. Cl.⁵ .............................................. C08F 20/00
[52] U.S. Cl. .................................... 525/438; 525/520; 523/415
[58] Field of Search ................ 525/438, 520; 523/415

[56] References Cited

U.S. PATENT DOCUMENTS

| | | | |
|---|---|---|---|
| 3,954,899 | 5/1976 | Chang et al. | 525/520 |
| 4,115,472 | 9/1978 | Porter, Jr. et al. | 525/446 |
| 4,423,179 | 12/1983 | Guagliardo | 524/539 |
| 4,423,185 | 12/1983 | Matsumoto et al. | 525/66 |
| 4,476,261 | 10/1984 | Patzschke et al. | 523/415 |
| 4,546,153 | 10/1985 | Kamatani et al. | 525/453 |
| 5,049,599 | 9/1991 | Steiert et al. | 523/210 |

*Primary Examiner*—Melvyn I. Marquis
*Assistant Examiner*—Randy Gulakowski
*Attorney, Agent, or Firm*—Frank G. Werner; Paul L. Marshall

[57] ABSTRACT

The invention relates to water-thinnable baking paints, the use thereof as filler material and intermediate stone chip resistant coat as well as a process for painting motor vehicle bodies.

The water-thinnable baking paints comprise as binders a combination of (I) 20 to 70% by weight of a water-thinnable polyurethane resin with an acid value of 15 to 35,
(II) 20 to 70% by weight of an epoxy resin-modified water-thinnable polyester which can be prepared by reacting a polyester (A) with a molecular weight (number average) below 2000, an acid value of 35-240 and a hydroxyl value of 56-320, with 0.3 to 1.5 equivalents per polyester molecule of an epoxy resin (B) having an epoxide equivalent weight of 170 to 1000, based on a bisphenol, and/or with a derivative of this epoxy resin (C) containing at least one epoxide group per molecule under reaction conditions where essentially only carboxyl groups react with epoxide groups, and
(III) 0 to 20% by weight of a water-thinnable aminoplast resin, the sum of the components (I) to (III) being always 100% by weight.

12 Claims, No Drawings

WATER-THINNABLE BAKING PAINTS AND USE THEREOF AS FILLER MATERIAL AND INTERMEDIATE STONE CHIP RESISTANT COAT, AS WELL AS PROCESS FOR PAINTING MOTOR VEHICLE BODIES

The invention relates to water-thinnable baking paints based on a mixture of polyurethane, polyester and, if desired, aminoplast resin as binders and to the use of these baking paints as filler material and intermediate stone chip resistant coat.

In addition, the invention also relates to a process for painting motor vehicle bodies, in which process
(1) an electrocoating paint is applied and baked,
(2) a filler material is applied and baked, and
(3) a single-coat or multicoat topcoat paint is applied and baked.

In another process a water-thinnable baking paint is applied as an intermediate stone chip resistant coat between process stages (1) and (2) and baked.

In the painting of motor vehicle bodies severe demands are made on the baking paints used as filler material and intermediate stone chip resistant coat. The baking paints which can be used as filler materials must be suitable for problem-free application by electrostatic or electrostatically aided spraying techniques even at a high solids content ($\geq 40\%$ by weight) of the spray paint, they must be bakeable without any blemishes occurring in the form of bubbles and they must furnish filler coats which possess optimum interadhesion characteristics, i.e. on the one hand the filler coat must adhere well to the electrocoating and, on the other hand, the topcoat must adhere well to the filler coat.

An important object of the filler coat is to fill and cover surface irregularities in order to level the undercoat for the subsequent topcoat. This cover of the undercoat structure and substrate blemishes must be accomplished without having to carry out much polishing of the filler coat, a requirement which can only be met when the filler material has good flow-out characteristics. Apart from the optical quality, important technical properties of the coating, for example corrosion protection and especially stone chip resistance and other mechanical hazards are also quite crucially dependent on the quality of the filler coat.

If water-thinnable baking paints are to be used as intermediate stone chip resistant coats, the main requirement of these paints is distinctly to improve the resistance of the complete system of coats to stone impact.

Filler materials and intermediate stone chip resistant coats used up to now have been predominantly baking paints based on organic solvents.

For economic and ecological reasons the paint industry has been striving to replace solvent-borne filler materials by water-thinnable filler materials.

Thus water-thinnable baking fillers based on acid polycondensates which can be prepared by reacting aminoplasts, polyesters, polyhydric alcohols, cyclic polycarboxylic acids and acrylate resins are known from DE-OS 3,537,855.

The water-borne fillers based on alkyd resins, known from prior art, leave however much to be desired. Thus they possess poor adhesion to various electrocoated substrates and also to various topcoats, and the solids contents obtainable for a viscosity which is suitable for spray application, is much too low. It is, however, especially the stone chip resistance of the resultant coating which must be further improved.

Furthermore, aqueous polyurethane-based coating compositions which give rise to coatings with good technical properties, have been known for a few years, but not filler materials. Thus, U.S. Pat. No. 4,423,179 describes aqueous coating compositions which may be applied to a variety of substrates by conventional methods. The resultant coatings possess improved flexibility and a resistance to solvents. The principal components of this coating composition ar an aminoplast resin and a polyurethane with a hydroxyl value of $>10$, prepared from a diisocyanate and a polyester polyol with an average molecular weight between 1200 and 1500. The use of dimeric fatty acids for the synthesis of the polyester polyol forms an essential part of the invention.

U.S. Pat. No. 3,954,899 discloses coating compositions likewise based on a polyurethane containing hydroxyl groups, an aminoplast resin as well as a compound which may or may not contain hydroxyl groups, for example a polyester, which compositions may be used not only in the form of an aqueous dispersion but also based on an organic solvent. These coating compositions are however employed especially for the coating of rubber or elastomeric plastics, for example polyurethanes or polyethylene foams. No reference is made in this document to the suitability or use of these coating compositions as filler material or intermediate stone chip resistant coat.

The object of the invention is thus to make available water-thinnable baking paints which may be employed as filler material or intermediate stone chip resistant coat and which meet the above requirements i.e. they must be capable of being applied by electrostatic or electrostatically aided spraying techniques, they must have a viscosity of 20 to 30 seconds as measured in a DIN 4 efflux cup at a solids content of over 40% by weight, they must possess good flow-out characteristics, they must be bakeable without any bubbles forming, they must have a long shelf-life and they must furnish films with optimum interadhesion to various primers and topcoats. They should in particular produce coatings with very good stone chip resistance.

This object is achieved according to the invention by preparing water-thinnable baking paints based on a mixture of polyurethane, polyester and, if desired, aminoplast resins as binders, wherein the baking paints comprise as binders a combination of (I) 20 to 70% by weight, preferably 40 to 60% by weight, of a polyurethane resin which has an acid value of to 35, preferably 20 to 30, and can be prepared by preparing an intermediate having terminal isocyanate groups from
  a) 4.0 to 1.9 mol of polyether and/or polyester diols with a number average molecular weight of 400 to 3000,
  b) 5.6 to 11.2 mol of diisocyanates and
  c) 1.6 to 3.7 mol of compounds which contain two groups reactive toward isocyanate groups, at least some of these compounds having at least one group capable of forming anions which is neutralized either before o after the incorporation of the component (Ic) into the polyurethane molecule, at least some of the free isocyanate groups of which intermediate are subsequently reacted with a polyol, preferably a triol, containing at least three hydroxyl groups, (II) 20 to 70% by weight, preferably 25 to 50% by weight, of an epoxy resin-modified water-thinnable ester which can be prepared by
(A) synthesizing a polyester from
  ($a_1$) at least one polycarboxylic acid containing at least three carboxyl groups or a reactive derivative of this acid, and/or
  ($a_2$) at least one polyol containing at least one carboxyl group, and
  ($a_3$) at least one polycarboxylic acid containing two carboxyl groups or a reactive derivative of this acid, and
  ($a_4$) at least one polyol,
    at least 10 mol %, preferably 30 to 70 mol % of the components ($a_1$), ($a_2$), ($a_3$) and ($a_4$) (based on ($a_1$)+($a_2$)+($a_3$)+($a_4$)=100 mol %), used containing at least one (cyclo)aliphatic structural unit containing at least six carbon atoms, which polyester has an average molecular weight (number average) below 2000, preferably 500 to 1500, an acid value of 35-240, preferably 50-120, a hydroxyl value of 56-320, preferably 80-200, and in which polyester all ($a_1$) and ($a_3$) components are condensed in via at least two carboxyl groups, and
(B) subsequently reacting this polyester obtained in this manner with 0.3 to 1.5, preferably 0.5 to 1.0 equivalents per polyester molecule of an epoxy resin having an epoxide equivalent weight of 170 to 500, based on a bisphenol, preferably bisphenol A, and/or with a derivative of this epoxy resin containing at least one epoxide group per molecule under reaction conditions where essentially only carboxyl groups react with epoxide groups to form an epoxy resin-modified polyester which is present in water-thinnable form after at least some of the free carboxyl groups are neutralized, and
(III) 0 to 20% by weight of a water-thinnable aminoplast resin,
the sum of the components (I) to (III) being always 100% by weight.

The water-dispersible polyurethane resin, used according to the invention in an amount of 20 to 70% by weight, preferably 40 to 60% by weight as the binder component I, is known from DE 3,545,618. It is obtained by reacting 4.0 to 1.9 mol of the component (Ia), 5.6 to 11.2 mol of the component (Ib) and 1.6 to 3.7 mol of the component (Ic) to form an intermediate having terminal isocyanate groups. The reaction of the components (Ia), (Ib) and (Ic) is carried out by well-known methods of organic chemistry (cf. for example Kunststoff-Handbuch, volume 7: Polyurethane, compiled by Dr. Y. Oertel, Carl Hanser Verlag, Munich-Vienna 1983), the reaction being preferably carried out in stages (for example a first intermediate is formed from the components (Ia) and (Ib) which is then reacted with (Ic) to form a second intermediate).

A simultaneous reaction of the components (Ia), (Ib) and (Ic) is, however, also possible.

The reaction is preferably carried out in solvents which are inert toward isocyanate groups and miscible with water. Advantageously used are those solvents which in addition to the above characteristics are also good solvents for the resultant polyurethanes and can be readily separated from aqueous mixtures. Acetone and methyl ethyl ketone are particularly suitable solvents.

In principle any polyether and/or polyester polyol which can be used for the preparation of binders based on polyurethanes, with a molecular weight of 400 to 3000 (number average) may be used as the component (Ia). Polyether and/or polyester diols are preferably employed.

Examples of polyether polyols are polyoxyalkylene polyols particularly poly(oxypropylene) glycols with a molecular weight of 300 to 3000 (number average). The polyester polyols which can be used as the component (Ia), may be prepared by generally known methods by esterification of organic dicarboxylic acids or their anhydrides with organic diols. Acid and/or hydroxyl components with a functionality greater than 2, may be used at the same time.

Polyester diols derived from lactones may also be used as the component (Ia). These products are obtained, for example, by reacting $\epsilon$-caprolactone with a diol. Such products are described in U.S. Pat. No. 3,169,945.

Polyester polyols whose acid component consists at least in part of dimeric fatty acids, may be also used as the component (Ia). Such systems are described, for example, in US-PS 4,423,179.

Any organic diisocyanate may be employed as the component (Ib) for the preparation of the polyurethane dispersion. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-bisphenylene diisocyanate, 1,5-naphthalene diisocyanate, 1,4-naphthalene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexene.

The diisocyanates used are preferably aliphatic diisocyanates, and particularly preferably cycloaliphatic diisocyanates.

Compounds which contain two groups reactive toward isocyanate groups are used as the component (Ic), at least some of the compounds used as the component (Ic) having at least one group capable of forming anions which has been neutralized with a tertiary amine prior to the reaction.

The proportion of ionic groups in the polyurethane molecule is controlled by adjusting the proportion of compounds capable of forming anions an those free from such groups in a certain ratio.

Groups which are suitable to react with isocyanate groups are particularly hydroxyl groups. The use of compounds which contain primary or secondary amino groups, may exert a negative influence on the processability of the dispersions described above. The type and amount of compounds containing amino groups to be added, if desired, may be determined by an average person skilled in the art with the aid of simple routine experiments.

Suitable groups to form anions are particularly the carboxylic acid and sulfonic acid groups. These groups may be neutralized with a tertiary amine prior to the reaction in order to prevent a reaction with the isocyanate groups.

Examples of a compound which contains at least two groups reactive toward isocyanate groups and at least one group capable of forming anions are dihydroxypropionic acid, dimethylpropionic acid, dihydroxysuccinic acid or dihydroxybenzoic acid. Also suitable are the polyhydroxy acids obtainable by oxidation of monosaccharides, for example gluconic acid, saccharic acid, mucic acid, glucuronic acid and the like.

Examples of compounds containing amino groups are α,δ-diaminovaleric acid, 3,4-diaminobenzoic acid, 2,4-diaminotoluene-5-sulfonic acid, 4,4,-diaminodiphenyl ether sulfonic acid and the like.

Examples of tertiary amines which are suitable for the neutralization of the anionic groups are trimethylamine, triethylamine, dimethylaniline, diethylaniline, triphenylamine, dimethylethanolamine and the like. If the neutralization is effected in the organic phase, triethylamine is preferably used, while for the neutralization in the aqueous phase dimethylethanolamine is preferred.

Examples which may be used as compounds having two groups reactive toward isocyanate groups but being free from groups capable of forming anions, are low-molecular diols or diamines with primary or secondary amino groups.

The intermediate containing isocyanate groups, formed from the components (Ia), (Ib) and (Ic) is reacted with a polyol containing at least three hydroxyl groups. The reaction is preferably regulated by stoichiometry of the components employed in such a manner that chain lengthening and, if desired, branching of the binder molecule is effected. Great care must be taken that this reaction does not yield any crosslinked products (cf. for example U.S. Pat. No. 4,423,179).

Examples of polyols which are suitable for this reaction, are trimethylolpropane, glycerol, erythritol, mesoerythritol, arabitol, adonitol, xylitol, mannitol, sorbitol, dulcitol, hexantriol, (poly)pentaerythritol etc..

Particularly outstanding results are achieved when trimethylolpropane is used as the polyol. It is also possible to react all four components (Ia), (Ib), (Ic) and the polyol at the same time, but particularly great care must be taken to avoid formation of crosslinked polyurethanes.

After the reaction of the intermediate obtained from (Ia), (Ib) and (Ic) with the polyol component, which reaction is preferably carried out in solvents which are inert toward isocyanate groups, are miscible with water, readily dissolve the resultant polyurethane and can be readily separated from aqueous mixtures (for example acetone or methyl ethyl ketone), and after any desired neutralization of the groups capable of forming anions, the reaction product is transferred to an aqueous phase. This can be effected, for example, by dispersing the reaction mixture in water and distilling off the organic solvent boiling below 100° C.

The aqueous phase is understood to be water which may still contain organic solvents. Examples of solvents which may be present in the water, are heterocyclic, aliphatic or aromatic hydrocarbons, monohydric or polyhydric alcohols, ethers, esters and ketones, for example N-methylpyrrolidone, toluene, xylene, butanol, ethyl glycol and butyl glycol, as well as their acetates, butyl diglycol, ethylene glycol dibutyl ether, ethylene glycol diethyl ether, diethylene glycol dimethyl ether, cyclohexanone, methyl ethyl ketone, acetone, isophorone or mixtures thereof.

For the preparation of the water-dispersible epoxy resin-modified polyester, used as the binder component II according to the invention, the type and amount of the components ($a_1$), ($a_2$), ($a_3$) and ($a_4$) should be chosen such that at least 10 mol %, preferably 30 to 70 mol % of the components ($a_1$), ($a_2$), $a(_3)$ and ($a_4$) (based on ($a_1$)+($a_2$)+($a_3$)+($a_4$)=100 mol %) used contain at least one (cyclo)aliphatic structural unit containing at least six carbon atoms and that a polyester can be synthesized from the components ($a_1$) and/or ($a_2$), ($a_3$) and ($a_4$) following generally known principles of synthesis, which polyester has an average molecular weight (number average) below 2000, preferably 500 to 1500, an acid value of 35 to 240, preferably 50 to 120, a hydroxyl value of 56 to 320, preferably 80 to 200, and in which polyester all ($a_1$) and ($a_3$) components are incorporated via at least two carboxyl groups.

The carboxyl groups of the polyester are supplied by the components ($a_1$), and/or ($a_2$). The polyester can be synthesized either by using the carboxyl group suppliers ($a_1$) and ($a_2$) alone or by using a mixture of the components ($a_1$) and ($a_2$).

While taking account of the above requirements, in principle any carboxylic acid which is suitable for the preparation of polyesters and contains at least three carboxyl groups or a reactive derivative thereof (for example anhydride, ester or halide) or a mixture of such acids or acid derivatives may be employed as the component ($a_1$). Examples of such compounds are trimellitic acid, trimesic acid (1,3,5-benzenetricarboxylic acid), pyromellitic acid and trimeric fatty acids. Trimellitic acid is used for preference.

While taking account of the above requirements, in principle any polyol which contains carboxyl groups and is suitable for the preparation of polyesters, or a mixture of such polyols, may be used as the component ($a_2$), a polyol being understood to be an organic compound which contains at least two hydroxyl groups. Dimethylolpropionic acid is used for preference as the component ($a_2$).

While taking account of the above requirements, in principle any polycarboxylic acid which is suitable for the preparation of polyesters and contains two carboxyl groups, or a reactive derivative thereof (for example anhydride, ester or halide) or a mixture of such acids or acid derivatives, may be used as the component ($a_3$). Examples of suitable acids are: phthalic acid, isophthalic acid, terephthalic acid, fumaric acid, maleic acid, endomethylenetetrahydrophthalic acid, succinic acid, adipic acid, suberic acid, azelaic acid, sebacic acid and dimeric fatty acids. Phthalic acid, isophthalic acid, adipic acid and dimeric fatty acids are used for preference.

While taking account of the above requirements, in principle any polyol which is suitable for the preparation of polyesters, or a mixture of polyols, may be used as the component ($a_4$), a polyol being understood to be an organic compound which contains at least two hydroxyl groups. Examples of suitable polyols are ethylene glycol, propanediols, butanediols, pentanediols, neopentyl glycol, hexanediols, diethylene glycol, glycerol, trimethylolethane, trimethylolpropane, pentaerythritol, dipentaerythritol, neopentyl glycol ester of hydroxypivalic acid, 2-methyl-2-propylpropane-1,3-diol, 2,2,4-trimethylpentane-1,3-diol and 2,2,5-trimethylhexane-1,6-diol. Neopentyl glycol, hexane-1,6-diol and neopentyl glycol ester of hydroxypivalic acid ar used for preference.

The polyester prepared from the components ($a_1$) and/or ($a_2$), ($a_3$) and $a_4$), having the above characteristics, is reacted with 0.3 to 1.5, preferably 0.5 to 1.0 equivalents per polyester molecule of an epoxy resin having an epoxide equivalent weight of 170 to 1000, preferably 170 to 500, based on a bisphenol, preferably bisphenol A, and/or with a derivative of this epoxy resin containing at least one epoxy group per molecule under reaction conditions where essentially only carboxyl groups react with epoxide groups, to form an epoxy resin-modified polyester which is present in water-thinnable form after at least some of the free carboxyl groups are neutralized.

Epoxy resins based on bisphenols, preferably on bisphenol A, are usually reaction products of bisphenols with epichlorohydrin. These epoxy resins should have an epoxide equivalent weight of 170 to 1000, preferably 170 to 500, and preferably contain on average one to two, particularly preferably two epoxide groups per molecule.

Derivatives of these epoxy resins which contain at least one epoxide group per molecule, may be also employed. Reaction products having at least one epoxide group per molecule, obtained from the above epoxy resins and a (cyclo)aliphatic monocarboxylic or polycarboxylic acid, preferably a monocarboxylic or polycarboxylic acid containing a (cyclo)aliphatic structural unit containing at least 6 carbon atoms, may be used as suitable derivatives. The derivatives may be prepared by reacting the epoxy resins under discussion for example with polymeric, preferably dimeric fatty acids, adipic acid, azelaic acid, dodecanedicarboxylic acid, long-chain monocarboxylic acids, tetrahydrophthalic acid or hexahydrophthalic acid, in such a manner that reaction products form which still contain at least one epoxide group per molecule.

Most particularly preferred water-thinnable coating compositions are obtained when the polyester synthesized in stage (A) is reacted with 0.3 to 1.5, preferably 0.5 to 1.0 equivalents per polyester molecule of a reaction product having at least one epoxide group per molecule, obtained from an epoxy resin based on a bisphenol, preferably bisphenol A, having an epoxide equivalent weight of 170 to 1000, preferably 170 to 500, and a (cyclo)aliphatic monocarboxylic or polycarboxylic acid containing a (cyclo)aliphatic structural unit containing at least 18 carbon atoms, preferably a polymeric, particularly a dimeric acid.

The reaction between the polyester synthesized in stage (A) and the epoxy resin or the epoxy resin derivative must be carried out in such a manner that essentially only the carboxylic groups of the polyester are reacted with the epoxy groups of the epoxy resin and that any competing reactions, for example the reaction of hydroxyl groups with epoxy groups, occurs only to a minor degree.

Suitable reaction conditions are for example: reaction temperature 25°-180° C., preferably 80° to 160° C. The reaction may be carried out in an inert solvent or without solvents, and is advantageously catalyzed by basic catalysts, for example tertiary amines.

After at least some of the carboxyl groups contained in the epoxy resin-modified polyester according to the invention have been neutralized with basic compounds, for example ammonia, aliphatic secondary and tertiary amines, such as diisopropanolamine, dimethylaminoethanol and diethylaminoethanol, as well as trimethylamine, triethylamine and tripropylamine, preferably tertiary amines, the epoxy-resin modified polyester according to the invention is present in water-thinnable form.

The amount of the component (II) contained in the binder of the water-thinnable baking paints according to the invention is between 20 and 70% by weight preferably 25 and 50% by weight.

In addition the baking paints according to the invention contain 0 to 20% by weight of a water-thinnable aminoplast resin. Water-thinnable melamine and/or benzoguanamine resins are used for preference.

Water-soluble melamine resins are known per se and are employed to a great extent. They are etherified melamine-formaldehyde condensation products. Their water-solubility depends—apart from the degree of condensation which should be as low as possible—on the etherification component, only the lowest members of the alkanol or ethylene glycol monoether series giving rise to water-soluble condensates. The hexamethoxymethylmelamine resins have the greatest significance. If solubilizers are used, even butanol-etherified melamine resins can be dispersed in an aqueous phase.

It is also possible to introduce carboxyl groups into the condensate. Transetherification products of highly etherified formaldehyde condensates with hydroxycarboxylic acids are water-soluble after neutralization via their carboxyl groups and may be used as additional binder components.

Other water-soluble or water-dispersible amino resins, for example benzoguanamine resins, may also be used instead of, or in conjunction with, the melamine resins described.

The baking paints prepared using the above binder dispersion and suitable for use a filler materials and intermediate stone chip resistant coats, may additionally comprise all pigments, fillers, plasticizers, stabilizers, wetting agents, dispersants, flow-out agents, antifoams and catalysts which are conventionally used for the production of automotive fillers and intermediate stone chip resistant coats. In a ready-for-use state, these baking paints have a viscosity of 20 to 30 seconds, measured in a DIN 4 efflux cup, a water content of 45 to 55% by weight and an organic solvent content of 4 to 10% by weight. All percentages by weight are based on the total coating composition (=100% by weight). The filler materials produced using the baking paints according to the invention may be applied without any problems by electrostatic or electrostatically aided spraying techniques and baked without bubble formation, and they furnish coatings which adhere well to a variety of substrates and to which adheres well a variety of topcoats. A further important benefit are the good flow-out characteristics of the filler material and especially the improved stone chip resistance of the resultant coating.

The invention also relates to a process for the painting of motor vehicle bodies, in which process
 (1) an electrocoating paint is applied and baked,
 (2) a filler material is applied and baked, and
 (3) a single-coat or multicoat topcoat paint is applied and baked,
and wherein a water-thinnable baking paint is used as filler material, which paint comprises as binders a combination of
 (I) 20 to 70% by weight, preferably 40 to 60% by weight, of a polyurethane resin which has an acid value of 15 to 35, preferably 20 to 30, and can be prepared by preparing an intermediate having terminal isocyanate groups from a) 4.0 to 1.9 mol of polyether and/or polyester diols with a number average molecular weight of 400 to 3000, b) 5.6 to 11.2 mol of diisocyanates and c) 1.6 to 3.7 mol of compounds which contain two groups reactive toward isocyanate groups, at least some of these compounds having at least one group capable of forming anions which is neutralized either before or after the incorporation of the component (Ic) into the polyurethane molecule, some of the free isocyanate groups of which intermediate are subsequently reacted with a polyol, preferably a triol, containing at least three hydroxyl groups, (II) 20 to 70% by weight, preferably 25 to 50% by weight, of an epoxy resin-modified water-thinnable polyester which can be prepared by (A) synthesizing a polyester from (a$_1$) at least one polycarboxylic acid containing at least three carboxyl groups or a reactive derivative of this acid, and/or (a$_2$) at least one polyol containing at least one carboxyl group, and (a$_3$) at least one polycarboxylic acid containing two carboxyl groups or a reactive derivative of this acid, and (a$_4$) at least one polyol, at least 10 mol%, preferably 30–70 mol %, of the components (a$_1$), (a$_2$), (a$_3$) and (a$_4$) (based on (a$_1$)+(a$_2$)+(a$_3$)+(a$_4$)=100 mol %) used containing at least one (cyclo)aliphatic structural unit containing at least six carbon atoms, which polyester has an average molecular weight (number average) below 2000, preferably 500 to 1500, an acid value of 35 to 240, preferably 50–120, a hydroxyl value of 56–320, preferably 80–200, and in which polyester all (a$_1$) and (a$_3$) components are incorporated via at least two carboxyl groups, and (B) subsequently reacting this polyester obtained in this manner with 0.3 to 1.5, preferably 0.5 to 1.0 equivalents per polyester molecule of an epoxy resin having an epoxide equivalent weight of 170 to , preferably 170 to 500, based on a bisphenol, preferably bisphenol A, and/or with a derivative of this epoxy resin containing at least one epoxide group per molecule under reaction conditions where essentially only carboxyl groups react with epoxide groups, to form an epoxy resin-modified polyester which is present in water-thinnable form after at least some of the free carboxyl groups are neutralized, and (III) 0 to 20% by weight of a water-thinnable aminoplast resin, the sum of the components (I) to (III) being always 100% by weight.

Compounds which are suitable for the preparation of the water-thinnable baking paint used in the process according to the invention are the compounds already discussed in the description of the water-thinnable baking paints.

A conventional electrocoating paint, capable of being cathodically deposited, is preferably applied as primer and baked. Any conventional topcoat paint may be used as the topcoat coating; two-coat coatings, particularly two-coat metallic coatings based on water-thinnable basecoat paints, are preferred.

The invention furthermore relates to a process for the painting of motor vehicle bodies, in which (1) an electrocoating paint is applied and baked, (2) an intermediate stone chip resistant coat is applied and dried, (3) a filler material is applied and baked, and (4) a single coat or multicoat topcoat paint is applied and baked, wherein a water-thinnable baking paint is used as intermediate stone chip resistant coat, which baking paint comprises as binders (I) 40 to 80% by weight, preferably 50 to 70% by weight, of a polyurethane resin which has an acid value of 15 to 35, preferably 20 to 30, and can be prepared by preparing an intermediate having terminal isocyanate groups from (a) 4.0 to 1.9 mol of polyether and/or polyester diols with a number average molecular weight of 400 to 3000, (b) 5.6 to 11.2 mol of diisocyanates and (c) 1.6 to 3.7 mol of compounds which contain two groups reactive towards isocyanate groups, at least some of these compounds having at least one group capable of forming anions which is neutralized either before or after the incorporation of the component (Ic) into the polyurethane molecule, at least some of the free isocyanate groups of which intermediate are subsequently reacted with a polyol, preferably a triol, containing at least three hydroxyl groups, (II) 10 to 40% by weight, preferably 10 to 25% by weight, of an epoxy resin-modified water-thinnable polyester which can be prepared by (A) synthesizing a polyester from (a$_1$) at least one polycarboxylic acid containing at least three carboxyl groups or a reactive derivative of this acid, and/or (a$_2$) at least one polyol containing at least one carboxyl group, and (a$_3$) at least one polycarboxylic acid containing two carboxyl groups or a reactive derivative of this acid, and (a$_4$) at least one polyol, at least 10 mol %, preferably 30–70 mol % of the components (a$_1$), (a$_2$), (a$_3$) and (a$_4$) (based on (a$_1$)+(a$_2$)+(a$_3$)+(a$_4$)=100 mol %) used containing at least one (cyclo)aliphatic structural unit containing at least six carbon atoms, which polyester has an average molecular weight (number average) below 2000, preferably 500 to 1500, an acid value of 35–240, preferably 50–120, a hydroxyl value of 56–320, preferably 80–200, and in which polyester all (a$_1$) and (a$_3$) components are incorporated via at least two carboxyl groups, and (B) subsequently reacting this polyester obtained in this manner with 0.3 to 1.5, preferably 0.5 to 1.0 equivalents per polyester molecule of an epoxy resin having an epoxide equivalent weight of 170 to 1,000, preferably 170 to 500, based on a bisphenol, preferably bisphenol A, and/or with a derivative of this epoxy resin containing at least one epoxide group per molecule under reaction conditions where essentially only carboxyl groups react with epoxide groups, to form an epoxy resin-modified polyester which is present in water-thinnable form after at least some of the free carboxyl groups are neutralized, (III) 0 to 15% by weight of a water-thinnable aminoplast resin and (IV) to 10% by weight of a water-thinnable polyester resin, the sum of the components (I) to (IV) being always 100% by weight.

The components (I) to (III) of the aqueous baking paint have already been described above. The water-thinnable polyesters used as the component (IV) in an amount from 0 to 10% by weight are polyesters containing free carboxyl groups i.e. polyesters with a high acid value. Two methods are basically known for introducing the required carboxyl groups in the resin system. The first method comprises interrupting the esterification when the desired acid value is reached.

After neutralization with bases, the polyesters obtained in this manner are water-soluble and form a film on baking. The second method comprises the formation of partial esters of dicarboxylic and polycarboxylic acids with polyesters of a low acid value, rich in hydroxyl groups. Anhydrides of the dicarboxylic acids which react under mild conditions with the hydroxyl component with the formation of a free carboxyl group, are usually used for this reaction.

The electrocoating paints and topcoat paints to be used in the process have already been described above.

The fillers according to the invention, but also waterborne fillers based on alkyd resins, known from prior art (for example from DE-OS 3,537,855), the water-borne fillers disclosed in patent application DE 3,636,368 as well as solvent-borne fillers may be used as filler materials.

The invention is elucidated in greater detail in the examples below. All parts and percentages are parts and percentages by weight, unless expressly stated otherwise.

Preparation of a Polyurethane Dispersion I 1056 g of a hydroxyl-terminated polyester obtained from 1 mol of neopentyl glycol, 2 mol of hexane-1,6-diol and 2 mol of adipic acid are heated together with 185 g of dimethylolpropionic acid for 2 hours at 100° C. in vacuo to remove water. After allowing the reaction mixture to cool to 60° C., 1100 g of methyl ethyl ketone, 1114 g of 4,4'-diisocyanatodicyclohexylmethane and 3 g of dibutyltin laurate are added with stirring. The reaction temperature is kept to 80° C. by cooling.

When the NCO content, based on the total product, reaches 2.1%, 74.5 g of trimethylolpropane, a further 523.7 g of methyl ethyl ketone and a further 3 g of dibutyltin laurate are added at 80° C. When a viscosity of 200–250 seconds (measured in a 6 mm cup, sample diluted with N-methylpyrrolidone in the radio 1:1) is reached, the reaction mixture is cooled and dispersed with 42.5 g of dimethylethanolamine in 1427 g of water with high-speed stirring. The methyl ethyl ketone is then distilled off in vacuo at a temperature not higher than 65° C. When most of the methyl ethyl ketone is distilled off, a further 1800 g of water are added and the remaining methyl ethyl ketone is distilled off. The resultant finely divided low-viscosity dispersion has a non-volatile content of 39% and a pH of 7.2.

Preparation of a Polyurethane Dispersion II 11.420 g of 4,4'-diisocyanatodicyclohexylmethane are heated to 50° C. 19.110 g of a polyester prepared from 2 mol of adipic acid, 2 mol of hexanediol and 1 mol of neopentyl glycol (acid value 1–3 g of KOH/g, 68% solution in N-methylpyrrolidone) are added in the course of 60 minutes at a rate determined by the resultant exothermic reaction. The temperature is allowed to rise to 90° C. and maintained for 30 minutes. The reaction mixture is then cooled to 6020 C. and 8.400 g of acetone, 1.640 g of dimethylolpropionic acid and 0.850 g of triethylamine are added with stirring.

The temperature is then kept at 60° C. until an NCO content of 1.46%, based on the initial weight, is reached. 0.640 g of trimethylolpropane, 2.760 g of acetone and 0.010 g of dibutyltin dilaurate are then added. The temperature is kept at 60° C. (reflux) until a viscosity of 140–160 seconds, measured in a DIN 4 cup, is reached. 51.000 g of deionized water are then added and the acetone is completely removed by vacuum distillation. The solids content is adjusted to 30% using 4.170 g of deionized water.

A finely divided dispersion is obtained with a viscosity of 20–50 seconds efflux time in a DIN 4 cup and a pH of 7.7–7.9.

Preparation of a Polyester Dispersion I 922.5 g of an epoxy resin obtained from bisphenol A and epichlorohydrin having an epoxide equivalent weight of 185 and 2.5 g of N,N-dimethylbenzylamine are weighed into a stainless steel reaction vessel which can be heated by means of heat transfer oil and is provided with an anchor stirrer, reflux condenser, protective gas inlet (N$_2$) and a temperature sensor for the reaction mixture temperature, and the reaction mixture is heated to 100° C. with stirring. 600.0 g of a technical polymeric fatty acid (dimer content at least 80% by weight trimer content not more than 20% by weight, monomer content not more than 1% by weight) are added in portions at 100° C. and the mixture is heated to 140° C. The reaction is allowed to proceed until an acid value of 1.5 and an epoxide equivalent weight of 535 are reached. The mixture is then diluted with 380 g of diethylene glycol monobutyl ether. (A 50% by weight solution of the product in diethylene glycol monobutyl ether has a solution viscosity of 120 mPa.s (23° C., ICI plate-cone viscometer).

442.4 g of hexane-1,6-diol and 166.6 g of a technical polymeric fatty acid (dimer content at least 80% by weight, trimer content not more than 20% by weight, monomer content not more than 1% by weight) are weighed into a stainless steel reaction vessel which can be heated by means of heat transfer oil and is provided with an anchor stirrer, packed column, vapor condenser with receiver, protective gas inlet (N$_2$) and temperature sensors for the reaction mixture temperature and the vapor temperature at the head of the column, and the reaction mixture is heated to 130° C. 184.3 g of isophthalic acid are then added and heating is continued. As soon as water of condensation begins to form (from about 160° C.) and while it is being removed by distillation, the temperature of the mixture is raised to a maximum of 220° C. at such a rate that the vapor temperature at the head of the column does not exceed 103° C. Condensation is allowed to proceed at 220° C. until the reaction mixture reaches an acid value of 10.5. The reaction mixture is cooled to 140° C. and 266.7 g of trimellitic anhydride are then added in portions to the reaction mixture at 140° C. with stirring. The mixture is then heated to 150° C. and esterification is allowed to proceed until the reaction mixture reaches an acid value of 67.7. The mixture is then cooled to 120° C. and diluted with ethylene glycol monobutyl ether in such a manner that a solution with a solids content of 90% by weight is obtained.

1110 g of this polyester resin solution are treated with 270 g of the epoxy resin solution prepared by the above procedure. The mixture is heated to 140° C. and the reaction is allowed to proceed at 140° C. until the product reaches an acid value of 40.9 (based on the solids content) and an epoxide equivalent weight of more than 50,000. The reaction mixture is then cooled to 100° C. and neutralized with 63.0 g of N,N-dimethylethanolamine.

The reaction mixture is then poured with stirring into 2,000 g of deionized water heated to 60° C. and by intensive stirring a stable binder dispersion is produced which is adjusted to a solids content of 35% by weight using 180 g of deionized water and N,N-dimethylethanolamine (determined after 60 minutes' drying at 130° C. in a circulating air oven) and a pH of 6.60 at 23° C.

Preparation of a Polyester Dispersion II 278.9 g of neopentyl glycol, 113.7 g of tetrahydrophthalic anhydride and 101.2 g of isophthalic acid are weighed into a stainless steel reaction vessel which can be heated by means of heat transfer oil and is provided with an anchor stirrer, packed column, vapor condenser with a receiver, protective gas inlet ($N_2$) and temperature sensors for the reaction mixture temperature and vapor temperature at the head of the column, and the reaction mixture is heated. As soon as water of condensation begins to form (from about 160° C.) and while water of condensation is removed by distillation, the temperature of the reaction mixture is raised to a maximum of 220° C. at such a rate that the vapor temperature at the head of the column does not exceed 105° C. Condensation is allowed to proceed at 220° C. until the reaction mixture reaches an acid value of 17-19 mg of KOH/g and the viscosity of the sample dissolved in butyl glycol (solids content 60%) is 1.0 to 1.2 dPas at 23° C. The mixture is cooled to 150° C. and 127.8 g of trimellitic anhydride are then added in portions to the reaction mixture with stirring. The mixture is then heated to 160° C. and esterification is allowed to proceed until the reaction mixture reaches an acid value of 55-59 mg of KOH/g and the viscosity of the sample dissolved in butyl glycol (solids content 60%) is 16.0-18.0 dPas at 23° C. The mixture is then rapidly cooled to 120° C. and dissolved in the reaction vessel in 103.9 g of butyl glycol. 30.0 g of dimethylethanolamine and 210 g of deionized water are then added with stirring and the reaction mixture is dissolved completely. The pH of the solution is adjusted to 6.3-6.5 and a solids content of 60% (60 minutes at 130° C.) using 9.2 g of dimethylethanolamine and 25.3 g of deionized water.

EXAMPLE 1

Preparation of a Filler I 0.2% by weight of a 50% solution of a commercial wetting agent based on tert.-acetylene glycol, dissolved in ethylene glycol, 4.3% by weight of deionized water and 0.1% by weight of N,N-dimethylethanolamine are added to 18% by weight of the polyester dispersion I and the mixture is formed into a paste with 11.0% by weight of after-treated rutile-type titanium dioxide, 11.0% by weight of a commercial, finely divided barium sulfate, 1.3% by weight of surface-treated talc and 0.1% by weight of a commercial carbon black. This mixture is introduced into a discontinuous laboratory sand mill and dispersed until a fineness of not more than 12 μm, measured in a Hegmann grindometer, is reached. The filler I is then obtained from the dispersion mixture by the addition of a further 6.0% by weight of the polyester dispersion I, 40% by weight of the polyurethane dispersion I, 4.0% by weight of low-molecular melamine resin highly etherified with methanol and 4.0% by weight of deionized water by generally known methods. The pH of this filler is adjusted to 7.8-8.0 using N,N-dimethylethanolamine. The viscosity of the filler is 120 seconds, measured at 20° C. in a DIN 4 efflux cup. The viscosity of the filler is then adjusted with deionized water to 25 seconds, measured at 20° C. in a DIN 4 efflux cup, and the product is sprayed in two crosspasses with an interim drying time of one minute, using a flow-cup spraygun (nozzle 1.2 mm, air pressure 4.5 bar) onto a phosphated steel panel coated with an electrocoating paint according to Example 6 of DE-PS 2,701,002. The application is carried out at an air temperature of 23° C. and a relative humidity of 60%.

In addition the filler is also applied electrostatically. This operation is carried out using an Ester-Behr installation with a TOS 300/5/8 bell, at a distance of 30 cm and at 30,000 revolutions per minute at a relative air humidity of 40-70%.

The coated steel panels are flashed off for 10 minutes at 23° C. and for 10 minutes at 80° C. in a circulating air oven, baked for 20 minutes at 160° C. in a circulating air oven and cooled.

All steel panels are then additionally sprayed with a solvent-borne white baking paint based on an alkyd resin containing saturated and unsaturated fatty acids (acid value 12, hydroxyl value 110) in combination with a melamine resin of medium molecular weight, partly etherified with n-butanol (ratio 2:1), pigmented with an after-treated rutile-type titanium dioxide (PVC 21%) and further comprising solvents and additives customarily employed in paint formulation for the automotive production line painting process; the panels are then baked for 30 minutes at 130° C. (dry film thickness 37 to 40 μm).

The coatings are distinguished in particular by very good stone chip resistance and by good flow-out, good cover of the primer structure and good interadhesion (cf. Table 1).

COMPARISON EXAMPLE

Preparation of a Filler II 0.2% by weight of a 50% solution of a commercial wetting agent based on tert.-acetylene glycol, dissolved in ethylene glycol, 4.3% by weight of deionized water and 0.1% by weight of N,N-dimethylethanolamine are added to 18% by weight of the polyester dispersion I and the mixture is formed into a paste with 11.0% by weight of after-treated rutile-type titanium dioxide, 11.0% by weight of commercial, finely divided barium sulfate, 1.3% by weight of surface-treated talc and 0.15% by weight of a commercial carbon black. This mixture is introduced into a discontinuous laboratory sand mill and dispersed until a fineness of not more than 12 μm, measured in a Hegmann grindometer, is reached. The filler II is then obtained from the dispersion mixture by the addition of a further 17.8% by weight of polyester dispersion I, 2.5% by weight of butyl glycol, 0.7% by weight of a water-thinnable acrylate resin as flow-out agent, 10.0% by weight of the polyester dispersion II, 2.4% by weight of low-molecular benzoguanamine resin, highly etherified with methanol/ethanol, 1.0% by weight of low-molecular melamine resin highly etherified with methanol/n-butanol, 1.0% by weight of a 10% solution of an amino salt of p-toluenesulfonic acid dissolved in butyl glycol, 16.55% by weight of deionized water, 1.8% by weight of a commercial solvent naphtha and 0.2% by weight of N,N-dimethylethanolamine by generally known methods. The pH of the filler is adjusted to 7.8 with N,N-dimethylethanolamine. The viscosity of the filler is 110 seconds, measured at 20° C. in a DIN 4 efflux cup.

This filler II is applied—in the manner described in Example 1 —to steel panels coated with electrocoating paints and baked. The cooled steel panels are sprayed with a baking topcoat paint in the same manner as in Example 1 and baked.

The results of the various tests of the coatings are summarized in Table 1.

EXAMPLE 2

Preparation of an Intermediate Stone Chip Resistant Coat 0.2% by weight of a 50% solution of a commercial wetting agent based on tert.-acetylene glycol, dissolved in ethylene glycol, 0.1% by weight of N,N-dimethylethanolamine and 7.6% by weight of deionized water are added to 3.5% by weight of a commercial 75% solution of a water-thinnable, modified epoxy resin ester in butyl glycol and 11.5% by weight of the polyester dispersion I, and the mixture is formed into a paste with 5.7% by weight of a commercial, finely divided barium sulfate, 7.6% by weight of an after-treated rutile-type titanium dioxide, 0.7% by weight of a surface-treated talc and 0.2% by weight of a commercial carbon black. The mixture is introduced into a discontinuous laboratory sand mill and dispersed until a fineness of not more than 12 μm, measured in a Hegmann grindometer, is reached. The intermediate stone chip resistant coat is then obtained from the dispersion mixture by adding 57.6% by weight of the polyurethane dispersion II, 2.9% by weight of a low-molecular melamine resin highly etherified with methanol and 2.4% by weight of a 1:10 solution of dimethylethanolamine in water by generally known methods. The pH of this intermediate stone chip resistant coat is adjusted to 8.0 with N,N-dimethylethanolamine. The viscosity of the intermediate stone chip resistant coat is 110 seconds, measured at 20° C. in a DIN 4 efflux cup.

The viscosity of the intermediate stone chip resistant coat is adjusted to 18 seconds, measured at 20° C. in a DIN 4 efflux cup, with deionized water and the product is applied—in the same manner as described in Example 1 for the filler—to steel panels coated with electrocoating paints and dried for 5 minutes at 110° C. under IR radiation. The application of the filler II, the baking of the filler and the coating of the steel panels with a topcoat paint then follows in the same manner as in Example 1.

The results of the various tests of the coatings are summarized in Table 1.

TABLE 1

| | Test results | | |
|---|---|---|---|
| | Filler I | Filler II | Intermediate stone chip resistant coat (ISCPC) plus filler II |
| Film thickness (μm) | 35 | 35 | 15 ISIPC 25 Filler II |
| Crosshatch test according to DIN 53151 (Gt B) | 1 | 1 | 1 |
| Erichsen cupping (mm) | 5.8 | 5.8 | 5.8 |
| Stone chip test* | 1-2 | 3 | 1-2 |

*The stone chip test is carried out using VDA stone chip test equipment (model 508) (the test surface is bonbarded twice with 500 g of steel shot in the course of 20 seconds; pressure 2 bar). The rating scale extends from 1 (very good) to 10 (very poor).

We claim:

1. A water-thinnable paint based on a mixture of polyurethane, polyester and, if desired, aminoplast resin as binders, wherein the baking paint comprises as binders a combination of
(I) 20 to 70% by weight of a polyurethane resin which has an acid value of 15 to 35, and is prepared by preparing an intermediate having terminal isocyanate groups from
 a) 4.0 to 1.9 mol of polyether and/or polyester diols with a number average molecular weight of 400 to 3000,
 b) 5.6 to 11.2 mol of diisocyanates and
 c) 1.6 to 3.7 mol of compounds which contain two groups reactive toward isocyanate groups, at least some of these compounds having at least one group capable of forming anions which are neutralized either before or after the incorporation of the component (Ic) into the polyurethane molecule,
at least some of the free isocyanate groups of which intermediate are subsequently reacted with a polyol containing at least three hydroxyl groups,
(II) 20 to 70% by weight of an epoxy resin-modified water-thinnable polyester which is prepared by
 (A) synthesizing a polyester from
  (a1) at least one polycarboxylic acid containing at least three carboxyl groups or a reactive derivative of this acid, and/or
  (a2) at least one polyol containing at least three carboxyl groups, and
  (a3) at least one polycarboxylic acid containing two carboxyl groups or a reactive derivative of this acid and
  (a4) at least one polyol,
   at least 10 mol % of the components (a1), (a2), (a3), and (a4) (based on (a1)+(a2)+(a3)+(a4)=100 mol %) used containing at least one (cyclo)aliphatic structural unit containing at least six carbon atoms, which polyester has an average molecular weight (number average) below 2000, an acid value of 35-240, a hydroxyl value of 56-320, and in which polyester all (a1) and (a3) components are incorporated via at least two carboxyl groups, and
 (B) subsequently reacting this polyester obtained in this manner with 0.3 to 1.5 equivalents per polyester molecule of an epoxy rein having an epoxide equivalent weight of 170 to 1000, based on bisphenol, and/or with a derivative of this epoxy resin containing at least one epoxide group per molecule, under reaction conditions where essentially only carboxyl groups react with epoxide groups, to form an epoxy resin-modified polyester which is present in water-thinnable form after at least some of the free carboxyl groups are neutralized, and (III) 0 to 20% by weight of a water-thinnable aminoplast resin, the sum of the components (I) to (III) being always 100% by weight.

2. A water-thinnable baking paint as claimed in claim 1, wherein some of the components (a1) and/or (a3) consist of at least one polymeric, preferably dimeric fatty acid.

3. A water-thinnable baking paint as claimed in claim 1, wherein the polyester obtained in stage (A) is reacted with 0.3 to 1.5 equivalents per polyester molecule of a reaction product having at least one epoxide group per molecule, obtained from an epoxy resin based on a bisphenol, having an epoxide equivalent weight of 170 to 1000, and a (cyclo)aliphatic monocarboxylic or polycarboxylic acid.

4. A water-thinnable baking paint as claimed in claim 3, wherein the (cyclo)aliphatic monocarboxylic or polycarboxylic acid is a polymeric monocarboxylic or polycarboxylic acid containing a (cyclo)aliphatic structural unit containing at least 18 carbon atoms.

5. A water-thinnable paint as claimed in claim 4 wherein the (cyclo)aliphatic monocarboxylic or polycarboxylic acid is a dimeric fatty acid.

6. A water-thinnable paint as claimed in claim 3 wherein the (cyclo)aliphatic monocarboxylic or polycarboxylic acid contain a (cyclo)aliphatic structural unit containing at least six carbon atoms.

7. A water-thinnable baking paint as claimed in claim 1 wherein the baking paint comprises 40 to 60% by weight of said polyurethane resin (I) and 25 to 50% by weight of said epoxy resin-modified water-thinnable polyester (II).

8. A water-thinnable baking paint as claimed in claim 1 wherein the polyurethane resin (I) has an acid value of 20 to 30.

9. A water-thinnable baking paint as claimed in claim 1 wherein the polyester (II) (A) has an average molecular weight (number average) to 500 to 1500, an acid value of 50–120, and a hydroxyl value of 80 to 200.

10. A water-thinnable baking paint as claimed in claim 1 wherein the polyester (II)(A) is reacted with 0.5 to 1.0 equivalents per polyester molecule of an epoxy resin having an epoxide equivalent weight of 170 to 500, based on a bisphenol.

11. A water-thinnable baking paint as claimed in claim 10 wherein said epoxide equivalent weight is based on bisphenol A.

12. A water-thinnable baking paint as claimed in claim 1 wherein said epoxide weight is based on bisphenol A.

* * * * *